United States Patent
Crawley et al.

(10) Patent No.: US 6,928,769 B2
(45) Date of Patent: *Aug. 16, 2005

(54) DISPOSABLE INSECT-CONTROL MEMBER

(75) Inventors: Lantz S. Crawley, Pennington, NJ (US); J. Roy Nelson, Pennington, NJ (US)

(73) Assignee: Bugjammer, Inc., Pennington, NJ (US)

( * ) Notice: Subject to any disclaimer, the term of this patent is extended or adjusted under 35 U.S.C. 154(b) by 4 days.

This patent is subject to a terminal disclaimer.

(21) Appl. No.: 09/924,007

(22) Filed: Aug. 7, 2001

(65) Prior Publication Data

US 2003/0033747 A1 Feb. 20, 2003

(51) Int. Cl.[7] .............................. A01M 1/02; A01M 1/06
(52) U.S. Cl. ............................................. 43/107; 43/114
(58) Field of Search ........................... 43/107, 114–116, 43/122

(56) References Cited

U.S. PATENT DOCUMENTS

| | | | | |
|---|---|---|---|---|
| 2,233,832 A | * | 3/1941 | Bryd ........................ | 43/107 |
| 2,264,875 A | * | 12/1941 | Greuling .................... | 43/114 |
| 3,968,590 A | * | 7/1976 | Kitterman ................... | 43/107 |
| 4,202,129 A | * | 5/1980 | Greenberg .................. | 43/131 |
| 4,411,093 A | * | 10/1983 | Stout et al. ................. | 43/114 |
| 4,438,584 A | * | 3/1984 | Baker et al. ................ | 43/114 |
| 5,022,180 A | * | 6/1991 | Albanese .................... | 43/114 |
| 5,170,583 A | * | 12/1992 | Coaker et al. .............. | 43/107 |
| 5,487,932 A | * | 1/1996 | Dunshee ................. | 15/104.93 |
| 6,088,949 A | * | 7/2000 | Nicosia et al. .............. | 43/107 |
| 6,360,477 B1 | * | 3/2002 | Flashinski et al. ........... | 223/86 |
| 6,568,123 B2 | * | 5/2003 | Nelson et al. .............. | 43/107 |

\* cited by examiner

*Primary Examiner*—Teri Pham Luu
*Assistant Examiner*—Kimberly S. Smith
(74) *Attorney, Agent, or Firm*—Darby & Darby

(57) ABSTRACT

An insect-control member includes a flexible or semi-rigid substrate having a thickness and a flexural modulus. The thickness and the flexural modulus are interrelated material properties, one value being defined by the other value so as to satisfy a prescribed criterion. The substrate supports an insect-interactive material. The substrate is generally optimally adapted to radiate pressure waves from a vibration generator to which it may be coupled in order to lure or repel insects.

25 Claims, 3 Drawing Sheets

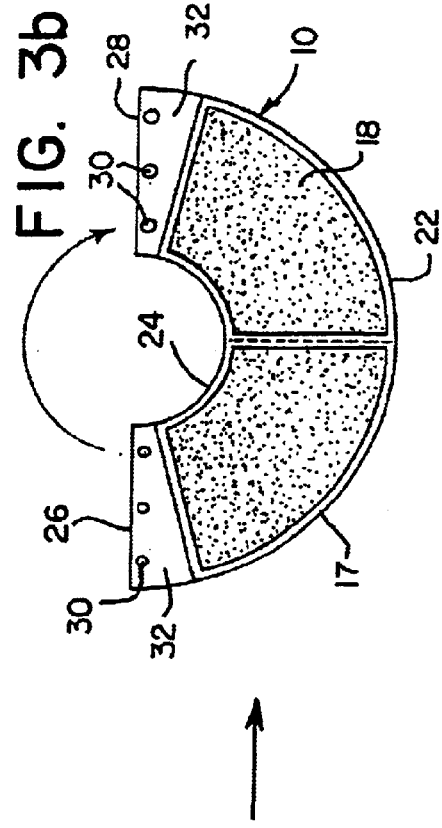
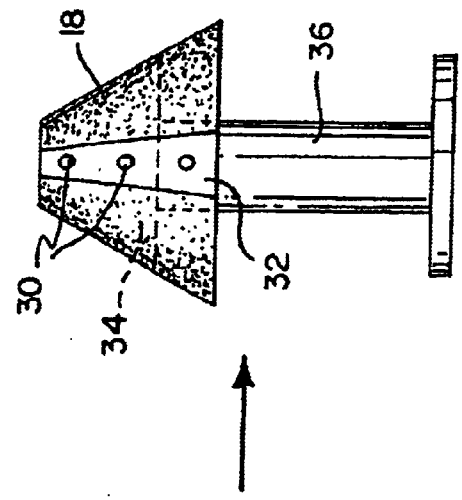
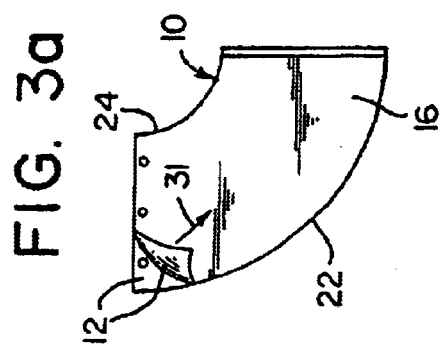
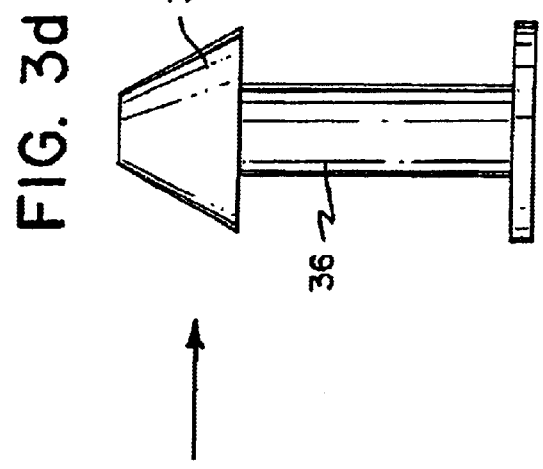
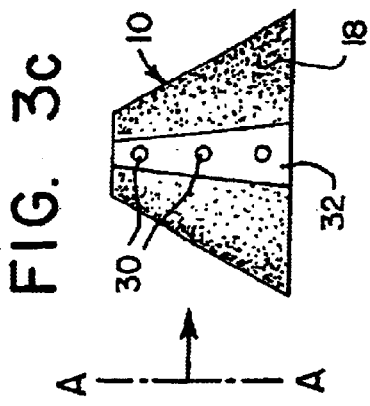

DISPOSABLE INSECT-CONTROL MEMBER

BACKGROUND OF THE INVENTION a) Field of the Invention

This invention generally relates to devices for destroying or otherwise controlling the presence of flying insects (e.g., mosquitoes and gnats) within a prescribed area, and more particularly, to such devices that destroy the flying insects using a sticky surfactant.

b) Description of the Prior Art

Owing to the prevalence and general annoyance of flying insects, many devices have been developed in the past in an attempt to control their local populations, especially around people perhaps trying to enjoy the outdoors or while indoors. One of the most popular insect-control members is "flypaper", and although this sticky paper can take on many different forms, the basic structure is generally common and includes a substrate or supporting surface, such as a strip or structure made of paper, or a thin strip of foil made of a plastic or metal sheet, onto which a sticky material is applied, such as a pressure sensitive adhesive or a viscous coating including mineral oil. Examples of such fly papers can be found in U.S. Pat. Nos. 395,640, 532,454, 552,644, 552,762, 761,202, 807,040, 862,467, 885,615, 897,919, 919, 507, 935,428, 1,194,736, 1,480,539, 1,643,118, 4,425,733.

In addition to a sticky surfactant, fly paper usually includes an alluring sex hormone or chemical and/or a attracting scent (and sometimes a poison) to help attract flying insects into contact with the sticky surface. Once contact is made, the insect cannot escape.

Recent efforts in the art of insect control have included the use of resonators that can be used to lure or repel insects with pressure waves (e.g., waves that mimic a heartbeat). Conventional fly paper constructions dampen or distort the pressure waves and thereby render a resonator less effective. Improvements in the construction of fly paper are needed and the present invention addresses this need.

SUMMARY OF THE INVENTION

An insect-control member includes a substrate having a thickness and a flexural modulus. The thickness and the flexural modulus are interrelated material properties, one value being defined by the other value so as to satisfy a prescribed criterion. The substrate supports an insect-interactive material.

In a preferred application, the substrate included is flexible or semi-rigid and has a vibration-coupling surface opposite the insect-engagement surface. The vibration-coupling surface is intended to be secured to a mechanical displacement generating structure so that the insect-control member vibrates at a prescribed frequency. The prescribed frequency preferably mimics the heartbeat of an animal and is used to lure flying insects to the proximity of the device. Other cues, e.g., carbon dioxide, heat, and/or chemical lures, cause orientation and landing on the exposed sticky surface. Thus, the insect-control member of the present invention is constructed to operate as a resonating antenna while also serving as backing for an insect-interactive material such as an adhesive, pesticide, or mineral oil.

In a preferred arrangement, the insect-control member is provided in a folded arrangement with the substrate folded along a fold-line so that a portion of the sticky surface abuts against a similarly sized portion of the same sticky surface. With this folded arrangement, the sticky surface is protected until the insect-control member is needed (for example, as a replacement of a used or old insect-control member), at which point the folded substrate is unfolded thereby exposing the interposed sticky material.

A preferred embodiment of the insect-control member includes a perimeter seal positioned on the insect-engagement surface of the substrate, adjacent to and surrounding the sticky material. The perimeter seal is preferably made from another type of adhesive and is sized and positioned so that in the folded configuration, half of the perimeter seal seals against the remaining half and thereby encloses and seals the sticky material similar to an envelope. The purpose of the perimeter seal is to discourage the typically viscous sticky material from slowly oozing out from between the folded substrate while the product is shipped and stored, especially in hot or humid environments.

A further feature of the preferred embodiment adds a light-tack adhesive to the vibration-coupling surface. This adhesive is used to firmly secure the substrate to a vibrating surface of a vibration-generating device so that the vibrations generated by the device efficiently transmit to the insect-control member. The vibrating substrate serves as a resonating antenna, effectively amplifying the alluring vibratory signal generated by the vibration-generating device to the surrounding air. The light-tack adhesive, when included, helps ensure an intimate contact between the insect-control member and the vibration-generating device for good vibration transfer from one element to the other. Intimate contact between the substrate and a vibrating surface can be achieved in other ways, however, including shaping the insect control member so that it fits snugly over the vibrating surface.

BRIEF DESCRIPTION OF THE DRAWINGS

FIGS. 3a–3e are assembly views of the insect-control member, illustrating the process of unfolding, assembling, and mounting to a vibration-generator, the insect-control member of FIG. 1;

DETAILED DESCRIPTION OF THE PREFERRED EMBODIMENTS

Figure 1:
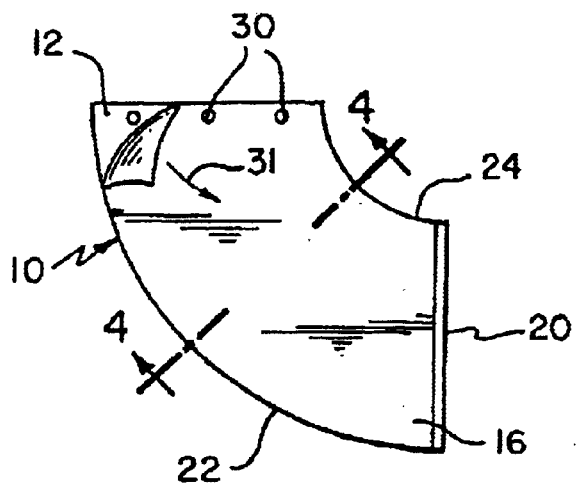
FIG. 1 is a sectional view of an insect-control member, shown in a folded and storable condition, according to a preferred embodiment of the invention.

Referring to FIGS. 1–2, and 4–5, an insect-control member 10, according to a preferred embodiment includes a supporting substrate 12 having an insect-engagement surface 14 and a vibration-coupling surface 16. An appropriate sticky material 18 (described below) is supported across a majority of insect-engagement surface 14, preferably in a generally uniform thickness.

As shown in FIG. 1, insect-control member 10 can be shipped and stored in a folded manner, folded about a fold-line 20, so that a portion of the insect-engagement surface 14 is folded upon itself. The fold-line 20 is preferably located along a geometrically symmetrical central axis so that exactly half of the area of insect-engagement surface 14 folds evenly about fold-line 20 into contact with the opposing half of insect-engagement surface 14. With this folded arrangement, the present insect-control member 10 obviates the need for a release sheet (not shown), and provides a surface 16 (discussed below) that a user can handle without contacting the sticky material.

Figure 2:
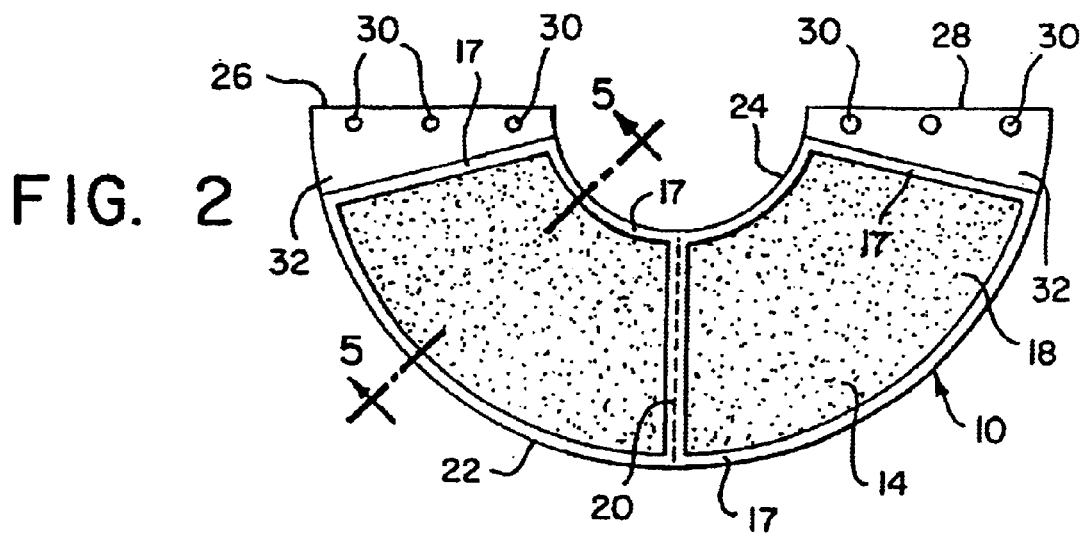
FIG. 2 is a front plan view of the insect-control member of FIG. 1, shown in an unfolded, yet unassembled condition.

As shown in FIG. 2, insect-control member 10 preferably includes a peripheral zone 17. It is preferred that peripheral zone 17 of insect-engagement surface 14 not be coated with sticky material 18. This helps discourage sticky material 18 from oozing from between the substrate when the device 10 is in its folded and stowed position, as shown in FIG. 1. It also helps the device to be easily assembled and otherwise handled without contacting sticky surface 18.

Although the present invention may take on any of a variety of shapes, depending on the particular size and shape of the vibration-generator, a preferred shape is frusto-conical (similar to the shape of a lampshade). To achieve this shape, as understood by those skilled in the art, the insect-control member 10 includes an arcuate outside edge 22, an arcuate inside edge 24 which is generally a concentric arc to outside edge 22, a first connecting edge 26 and a second connecting edge 28. When in the folded-orientation, as shown in FIG. 1, half of the inside edge 24 folds into intimate contact with the remaining half of the inside edge 24. Similarly, half of the outside edge 22 folds into intimate contact with the remaining half of the outside edge 22 and the first connecting edge 26 generally aligns with the second connecting edge 28.

Appropriate fasteners 30, such as snaps, hook and loop fasteners (e.g., Velcro-brand fasteners), or sticky tape are positioned adjacent to first and second connecting edges 26, 28, respectively. Alternatively, a portion of the sticky material 18 may be used as an appropriate fastener 30, as described below.

Referring to FIGS. 3a–e, in use, the two halves of the folded insect-control member 10 are pried apart (as shown by arrow 31 in FIGS. 1 and 3a), thereby exposing the sticky material 18, and resulting in a general U-shape structure, as shown in FIGS. 2 and 3b. The user then arranges the structure so that first connecting edge 26 aligns and overlaps with second connecting edge 28 and the structure forms a 3-dimensional frusto-conical assembly, with the sticky material 18 positioned outwardly. Fasteners 30 are then applied to each other so that the 3-dimensional frusto-conical assembly can maintain its shape, as shown in FIG. 3c. The sticky material 18 is preferably absent around fasteners 30 in a fastener zone 32, unless, of course, the sticky material is used to secure first connecting edge 26 to second connecting edge 28.

Once assembled in its frusto-conical shape, insect-control member 10 is positioned onto an output resonating surface 34 which is coupled to a vibration generator 36 (shown in FIG. 3d and also known as an insect control station) so that the vibration-coupling surface 16 is in flush contact with a portion of the output resonating surface 34, as shown in FIG. 3e. Insect-control member 10 preferably increases the effective size of output resonating surface 34, thereby amplifying the vibratory output signal of vibration generator 36 and extending the effective range of the insect-control member. A suitable vibration generator 36 is described in U.S. application Ser. No. 09/885,216, filed Jun. 20, 2001, entitled "Blood-Sucking Insect Control Station," now U.S. Pat. No. 6,568,123, issued May 27, 2003, which is hereby incorporated by reference as of set forth in its entirety herein. The vibration generator 36 (therein referred to as an insect control station) includes a sound player and a speaker that transduces a signal into a sound that simulates a heartbeat to attract insects such as mosquitoes and biting flies or to repel them. Only a limited frequency range need be produced by the speaker to simulate the heartbeat. The volume or decibel output of the control station is established so that the target insect or pest can detect the sound and perceive it as a heartbeat so as to be attracted to or repelled from the area of the speaker, as desired. Preferably, the acoustic output of the control station is set at a level that is not readily audible to humans. The effective area (or volume) to which mosquitoes and biting flies are attracted or repelled is at least partially a function of the decibel level output of the speaker.

The sticky material 18 can be any of a variety of commercially available insect-alluring and controlling compositions. One preferred material is a pressure sensitive adhesive called "32 UVR" commercially available from Atlantic Paste and Glue, located in Brooklyn, N.Y. This is a UV stabilized pressure sensitive adhesive with adhesion characteristics similar in properties to Atlantic Paste and Glue's "Fly 2+". The surfactant or sticky material 18 used can include an alluring chemical (such as a sex attractant hormone) and, if necessary, a poison to help lure the insects and quickly kill them once contact is made with the sticky material 18. The sticky material can be scented with an alluring scent, such as the scent of cherries or peanut butter. The sticky material also can be clear or appropriately colored, such as fluorescent chartreuse, a color that has been shown to attract flying insects.

Figure 7:
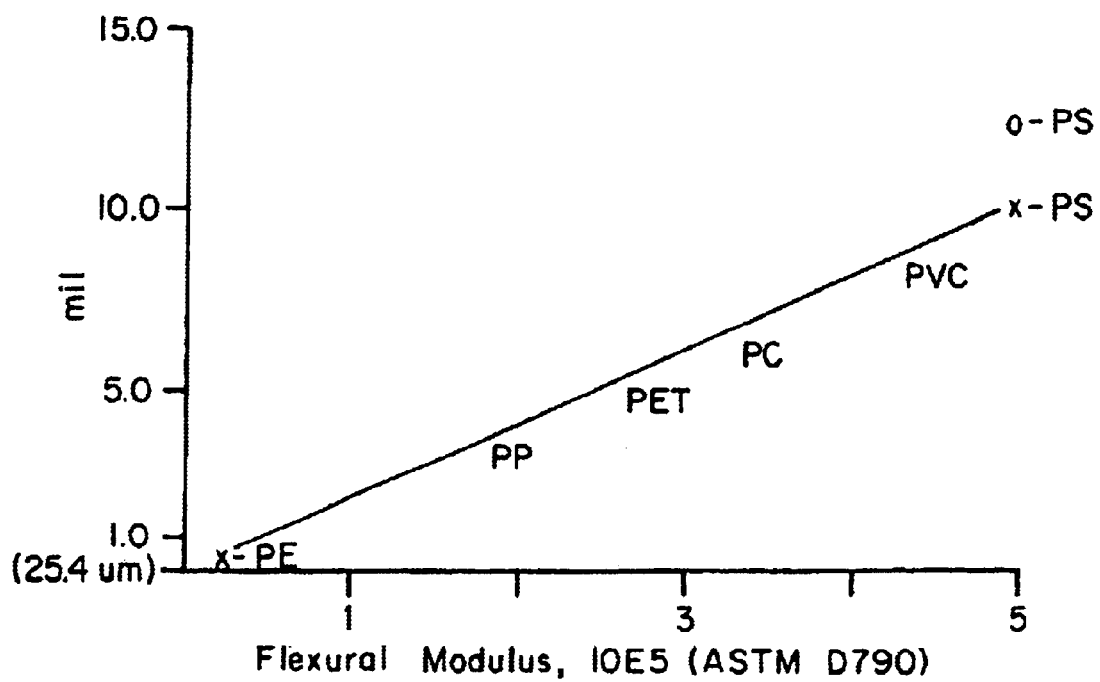
FIG. 7 is a chart illustrating a generally optimized relationship between flexural modulus and thickness for a variety of materials that can be used as the supporting substrate of the insect control member.

The material properties of the supporting substrate 12 comprise an important aspect of the present invention. We have discovered a relationship between the flexural modulus and the thickness of a material to be used (as measured in a direction normal to the insect-engagement surface 14) which permits selection of a suitable material composition for the substrate 12. Likewise, the relationship we discovered permits a suitable substrate to be specified in terms of thickness when a material composition has already been selected. The relationship permits the substrate to be generally optimally adapted to radiate pressure waves from a vibration generator to which it can be coupled in order to lure or repel insects when placed into service. FIG. 7 illustrates this relationship between flexural modulus and thickness for a variety of materials that can be used as the supporting substrate 12 of the insect control member 10. While FIG. 7 utilizes flexural modulus as the basis for the selection, other bases can be used, such as tensile strength.

The curve traced in FIG. 7 represents a generally optimized relationship between flexural modulus and thickness for polyethylene (PE), polypropylene (PP), polyester (such as polyethylene teraphalate, PET), polycarbonate (PC), polyvinyl chloride (PVC), and Polystyrene (PS). In their unfilled, homopolymer form, these materials have known flexural modulus values as reported, for example, in Plastics Technology, Manufacturing Handbook & Buyers' Guide. For example, the flexural modulus is 10E5 psi for these materials in unfilled, homopolymer form are:

| Material | | Flexural Modulus (10E5) |
|---|---|---|
| PE | (low density) | 0.2 |
|  | (high density) | 1.2 |
| PP |  | 1.5–2.0 |
| polyester |  | 2.6 |
| PC |  | 3.4 |
| PVC |  | 3.5–4.5 |
| PS |  | 4.5–5.0 |

If these polymers are filed or blended, the flexural modulus will vary from the data shown in the table above, but in a predictable and known manner.

Each of these materials is associated with a natural range of flexural moduli. For example, there is a distribution of molecular weight associated with the material synthesis process, and greater stiffness is attributable to a high molecular weight distribution. Such variations, as well as processing conditions, can require selection of a somewhat thicker or thinner substrate as a function of the variation from standard values that a given sample of material represents. The curve of FIG. 7, namely, the dashed line, is a guide, however, in the selection of a suitable material for use as the substrate 12. The curve shows a generally linear relationship between flexural modulus and thickness such that a suitable substrate has a thickness to flexural modulus ratio within a prescribed range of about $1.7 \times 10^{-5}$ to about $2.8 \times 10^{-5}$ mils/PSI.

The region above the curve in FIG. 7 represents thicknesses for a given flexural modulus that are more likely to dampen vibrations from the vibration generator 36. In particular, samples that have a thickness well above the curve for a given flexural modulus, have a dampening effect and progressively reduce the ability to transmit sound wave vibrations suitable for attracting biting insects. On the other hand, the region below the curve represents samples that may not be suitable for use as the substrate 12 because they present potential handling issues. For example, polystyrene is very stiff and so a thin specimen is more likely to snap whereas polyethylene (at the other end of the curve) is so fragile that it is likely to rip if too thin a piece is used. Successful results have been obtained when using polystyrene at 10 mil thickness and when using a low density polyethylene (LDPE) in a 0.5 mil thickness (illustrated as "x" marks in the chart). However, when a material such as a 12 mil thickness polystyrene was used, dampening was observed (see "o" in the chart) Thus, though the thicker sample of polystyrene can function as a substrate, it is not optimum. It should be understood that the curve of FIG. 7 defines a range of thicknesses for a number of materials that can be used, on either side of the line, with optimum results being substantially aligned with points on the curve. By way of comparison, samples that stray from the optimum have shown a dramatically reduced performance in attracting biting insects.

The substrate is constructed so as to vibrate at a prescribed frequency that preferably mimics the heartbeat of an animal and is used to lure flying insects to the proximity of the device. A waveform having acoustic energy in the range of 20 to 500 cps is generally desired. Evidence suggests that mosquitoes will be attracted to acoustic signals in the range of from 50 cps to 120 cps, and will be strongly attracted to its acoustic signals in the range of from about 150 cps to about 350 cps. Applicants presently believe that one or more frequencies in the range of 150 cps to 250 cps together with one or more frequencies in the range of peak in the 300 cps to 500 cps range comprise the best signal for attracting mosquitoes. Discrete "ejection sounds" or clicks associated with a damaged heart have a frequency in the 160 to 180 cps range, and these clicks also be a reason that mosquito are particularly attracted individuals with damaged hearts. A waveform can be constructed to have a primary peak in the 150 cps to 250 cps range and a secondary peak in the 300 cps to 500 cps range. A suitable waveform can include frequency components in these ranges alone, or so that the frequency components in these two peaks dominate other frequencies in the waveform.

The medical profession, and particularly cardiologists, have recognized that the acoustic signals from a heartbeat are not simply the "lub-dub" sounds familiar to lay individuals. More particularly, medical specialists have recognized the significance of the cadence, rhythm, and relationship between particular components of the heart sound, which are medically referred to as the S1, S2, S3, and S4 components of the heartbeat. While each of these component sounds in turn can have fluctuations functionally dependent upon the respiratory cycle of the individual, the characteristic frequency of these components is not significantly affected by this respiratory cycle. During both inspiration and expiration, the characteristic frequency of the S1 and S2 components for a healthy heart is normally in the range of from 110 cps to 120 cps, while the characteristic frequency of the S3 component is in the range of from 70 cps to 90 cps. The S4 component can be inaudible to humans using a normal stethoscope for a patient less than 50 years old, although there is no reason to believe that the S4 component, which is generally in the range of 50 cps to 70 cps, is not detected by mosquitoes. As indicated above, evidence has shown that mosquitoes are strongly attracted to individuals with a damaged heartbeat, and the medical profession has studied in depth the timing, configuration, and duration of heart murmurs. While certain murmurs have a relatively low frequency in the range of from 60 cps to 100 cps, heart murmurs more often are in the medium-frequency range of from 100 cps to 250 cps, or are in the higher frequency range of more than 300 cps associated with "blowing."

Figure 4:
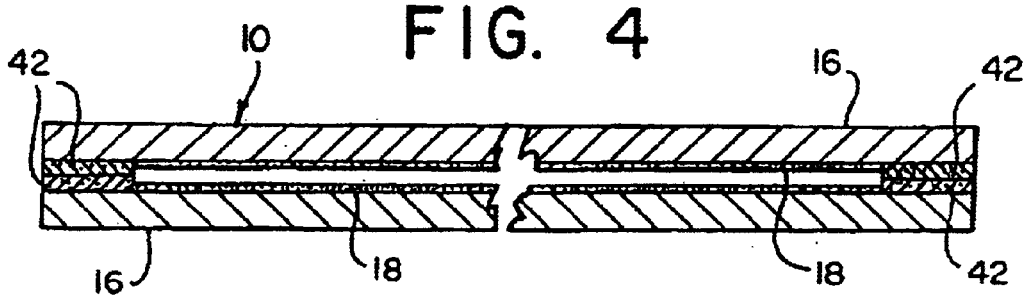
FIG. 4 is a sectional view taken along the line 4—4 of FIG. 1, now showing a second embodiment which includes a perimeter seal arrangement with the device in its folded condition.
Figure 5:
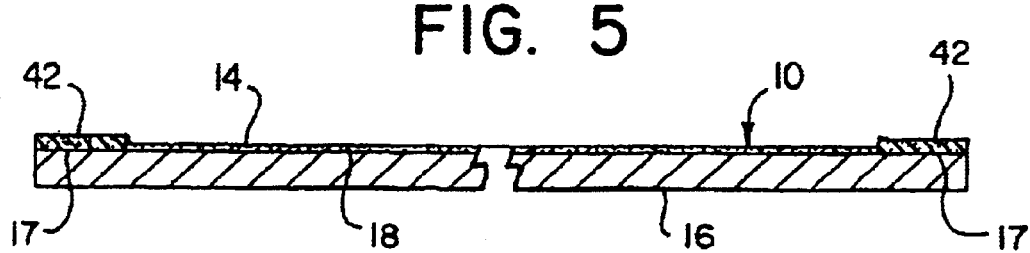
FIG. 5 is a sectional view taken along the line 5—5 of FIG. 2, now showing the second embodiment in its unfolded condition.

Referring now to FIGS. 4 and 5 and according to another embodiment of the invention, as described above, insect-control member 10 is coated on insect-engagement surface 16 except within peripheral zone 17. To further prevent sticky material from leaking out from between the folded substrate, a seal 42 is provided along the perimeter of device 10, within peripheral zone 17. Seal 42 can be made from any appropriate adhesive that is sufficient to effectively stem the flow of sticky material 18 from reaching the margins 22–28. Seal 42 is particularly beneficial if the sticky material selected becomes fluid-like under the influence of gravity and/or when stored in a hot or humid environment. Seal 42 is preferably made from a pressure-sensitive, medium-tack adhesive so that it may be relatively easily separated by a user when the device 10 is unfolded. As shown in FIG. 4, seal 42 is sized and shaped to align with and adhere to itself when device 10 is folded. When the substrate is unfolded, as shown in FIG. 5, seal 42 becomes exposed and may even aid in capturing some flying insects if contact is made or serve as a fastener 30.

Figure 6A:
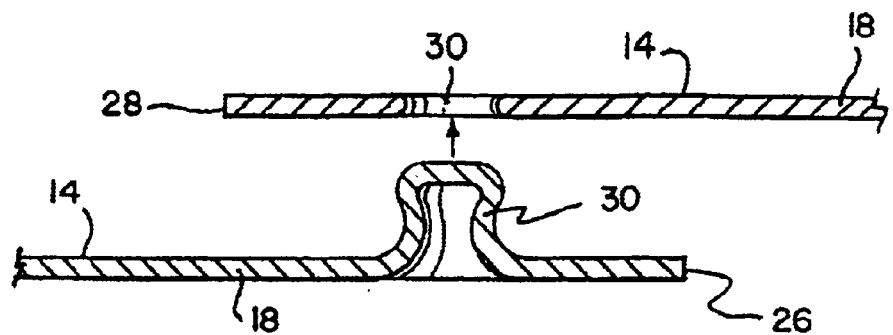
FIG. 6a is a partial sectional view, in detail, of a fastener used to secure the insect-control member in an assembled condition.
Figure 6B:
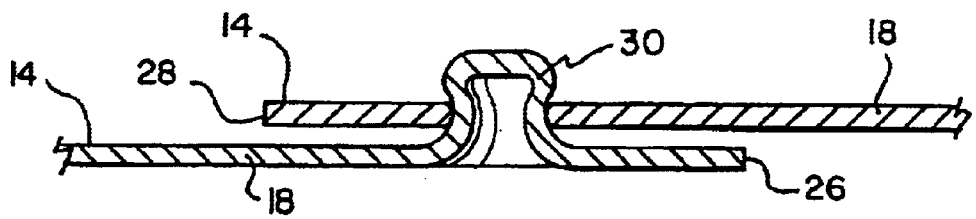
FIG. 6b is the partial sectional view of FIG. 6a, now showing the insect-control member in the fastened position.

Referring now to FIGS. 6a–6b, one embodiment of the fastener 30 comprises complimentary protuberances and apertures. These can be formed by conventional stamping and hole punching techniques, as known in the art. For example, stamping the substrate 10 can cause a protuberance to form which has a bulbous end and a necked-down extension extending from the substrate. The bulbous portion snap-locks into a punched aperture. Other arrangements for the fastener are within the spirit of the present invention, such as the sticky surface 18 or the perimeter seal 42.

In service, the insect-control member 10 is disposed upon an insect control station, and preferably an insect control station having a vibration generator 36. After a period of time, the proper vibration attracts insects to the proximity of the device. Other cues, e.g., carbon dioxide, heat, and/or chemical lures, cause orientation and landing on member 10 to which they preferably become affixed by action of a glue. Alternatively, the insect-control member 10 can include an oil-based composition (e.g., a composition including a mineral oil base) that is adapted to adhere to a contacting insect and be carried off by said insect for reaction with said insect at a remote location, e.g., due to reflow.

While an illustrative embodiment of the invention has been described, various modifications will be apparent to those of ordinary skill in the art. Such modifications are within the spirit and scope of our invention, which is limited and defined only by the appended claims.

What is claimed is:

1. In combination, a vibration generator and a disposable insect control member, comprising:

a vibration generator having a source of vibration and an output surface radiating sound waves from the source of vibration;

a plastic substrate having a thickness and a flexural modulus, the thickness being within a range of thicknesses bounded at the upper end to 10 mil, the substrate including a front surface which defines a central insect-interactive zone, one of the thickness and the flexural modulus being defined by the other so as to satisfy a prescribed criterion and to radiate sound waves at a prescribed frequency that mimics the heartbeat of an animal to thereby lure insects into proximity with the substrate;

wherein the substrate is foldable between a stowed position and a usable position;

an insect-interactive material supported within the insect-interactive zone; and fastening means for maintaining the disposable insect control member in the usable position suitable for seating snuggly about at least a portion of the output surface of the vibration generator.

2. The insect control member as in claim 1, wherein the prescribed criterion is a ratio between the thickness and the flexural modulus.

3. The insect control member as in claim 1, wherein the prescribed criterion is a range of ratios between the thickness and the flexural modulus.

4. The insect control member as in claim 3, wherein the substrate is polyethylene and the thickness is at least about 0.5 mils.

5. The insect control member as in claim 1, wherein a material for the substrate is selected from the group of: polyethylene, polypropylene, polyester, polycarbonate, polyvinyl chloride, and polystyrene.

6. The insect control member as in claim 5, wherein a range of thicknesses that satisfy the prescribed criterion are defined by the material selected for the substrate.

7. The insect control member as in claim 1, wherein the substrate is a predetermined polymer and wherein the predetermined polymer has a range of thicknesses that satisfy the prescribed criterion.

8. The insect control member as in claim 7, wherein the polymer is an unfilled homopolymer.

9. The insect control member as in claim 1, wherein the substrate further includes a generally central folding axis, the substrate being foldable about the central folding axis to a stowed position wherein a first half of the front surface folds upon a second half of the front surface, and being unfoldable to a usable position wherein first and second halves of the front surface are exposed.

10. The insect control member as in claim 9, further comprising a sealing material located within the sealing zone, the sealing material being adapted to selectively seal and protect the insect-interactive material when the substrate is in the stowed position.

11. The insect control member as in claim 1, wherein the insect-interactive material is sticky and adapted to adhere a contacting insect to the substrate.

12. The insect control member as in claim 1, wherein the insect-interactive material comprises an oil-based composition that is adapted to adhere to a contacting insect and be carried off by the insect for reaction with the insect at a remote location.

13. The insect control member as in claim 1, wherein the insect-interactive material comprises mineral oil.

14. The insect control member as in claim 1, wherein the prescribed frequency is in a range of from about 150 cps to about 350 cps.

15. The insect control member as in claim 1, wherein the prescribed frequency is in a range of 150 cps to 250 cps together with one or more frequencies in a range of 300 cps to 500 cps.

16. The insect control member as in claim 15, wherein the prescribed frequency includes a primary peak in the 150 cps to 250 cps range and a secondary peak in the 300 cps to 500 cps range.

17. The insect control member as in claim 1, wherein the prescribed frequency is in a range of 160 cps to 180 cps.

18. The insect control member as in claim 1, wherein the prescribed frequency includes a range of frequencies including one or more frequencies indicative of a damaged heartbeat.

19. The insect control member as in claim 18, wherein the range associated with the damaged heartbeat is in the range of from 60 cps to 100 cps.

20. The insect control member as in claim 18, wherein the range associated with the damaged heartbeat is from 100 cps to 250 cps.

21. The insect control member as in claim 18, wherein the range associated with the damaged heartbeat is more than 300 cps.

22. The insect control member as in claim 1, wherein the prescribed frequency is in a range of from 50 cps to 120 cps.

23. The insect control member as in claim 1, wherein the prescribed frequency is in a range of 20 to 500 cps.

24. In combination, a vibration generator and a disposable insect control member, comprising:

a vibration generator having a source of vibration and an output surface radiating sound waves from the source of vibration;

a plastic substrate including a front surface which defines a central insect-interactive zone and a peripheral sealing zone that surrounds the insect-interactive zone, the substrate having a thickness and a flexural modulus, one of the thickness and the flexural modulus being defined by the other so as to satisfy a prescribed criterion and to radiate sound waves at a prescribed frequency that mimics the heartbeat of an animal to thereby lure insects into proximity with the substrate;

wherein the substrate is foldable about a generally central folding axis to a stowed position wherein a first half of the front surface folds upon a second half of the front surface, and is unfoldable to a usable position wherein first and second halves of the front surface are exposed;

an insect-interactive material supported on the substrate within the insect-interactive zone; and a first fastener on one side of the folding axis adapted to engage with a second fastener on another side of the folding axis so that connection of the first and second fasteners maintains the disposable insect control member in the usable position and in an assembled configuration for seating snuggly about at least a portion of the output surface of the vibration generator.

25. The insect control member as in claim 24, wherein the range of material thicknesses is bounded at the upper end to 10 mil.

* * * * *